United States Patent
Raman et al.

(10) Patent No.: US 11,550,784 B2
(45) Date of Patent: Jan. 10, 2023

(54) METHOD AND SYSTEM FOR FACILITATING UNIVERSAL SEARCH

(71) Applicant: JPMorgan Chase Bank, N.A., New York, NY (US)

(72) Inventors: Kasthuri Rangan Raman, Glen Mills, PA (US); Janie Gordon, Malvern, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 88 days.

(21) Appl. No.: 17/315,937

(22) Filed: May 10, 2021

(65) Prior Publication Data
US 2022/0358120 A1 Nov. 10, 2022

(51) Int. Cl.
*G06F 16/242* (2019.01)
*G06F 16/248* (2019.01)
*G06F 16/22* (2019.01)
*G06F 16/28* (2019.01)

(52) U.S. Cl.
CPC ............ *G06F 16/243* (2019.01); *G06F 16/22* (2019.01); *G06F 16/248* (2019.01); *G06F 16/287* (2019.01); *G06F 16/288* (2019.01)

(58) Field of Classification Search
CPC ...... G06F 16/243; G06F 16/22; G06F 16/248; G06F 16/287; G06F 16/288
USPC ........................................................ 707/706
See application file for complete search history.

(56) References Cited

U.S. PATENT DOCUMENTS

| | | | |
|---|---|---|---|
| 2011/0043652 A1* | 2/2011 | King | G06F 40/194 707/706 |
| 2011/0252016 A1* | 10/2011 | Shacham | G06F 16/951 707/706 |
| 2012/0209705 A1* | 8/2012 | Ramer | G06Q 30/0273 705/14.51 |
| 2013/0218921 A1* | 8/2013 | Palay | G06F 16/3334 707/769 |
| 2015/0058324 A1* | 2/2015 | Kauwe | G06F 16/248 707/722 |
| 2015/0370895 A1* | 12/2015 | Denman | G06F 16/284 707/706 |
| 2017/0242886 A1* | 8/2017 | Jolley | G06F 40/232 |

FOREIGN PATENT DOCUMENTS

| | | | | |
|---|---|---|---|---|
| CA | 2653299 A1 | * | 8/2009 | |
| CN | 106575307 A | * | 4/2017 | G06F 16/134 |
| CN | 106605221 A | * | 4/2017 | G06F 16/134 |

\* cited by examiner

*Primary Examiner* — Dung K Chau
(74) *Attorney, Agent, or Firm* — Greenblum & Bernstein, P.L.C.

(57) ABSTRACT

A method for providing search capabilities across platforms to identify information from related accounts is disclosed. The method includes receiving, via an application programming interface, a request from a user interface, the request including a search string and a user profile; identifying an account identifier based on the user profile; associating the identified account identifier with the request; retrieving, from a networked repository, an indexed field based on the request and the associated account identifier; configuring the retrieved indexed field for presentation via the user interface; and presenting, via the user interface, the configured indexed field in response to the request.

20 Claims, 15 Drawing Sheets

METHOD AND SYSTEM FOR FACILITATING UNIVERSAL SEARCH

BACKGROUND

1. Field of the Disclosure

This technology generally relates to methods and systems for universal searching, and more particularly to methods and systems for providing search functionalities across a plurality of platforms via an application programming interface to facilitate identification of related information.

2. Background Information

Many business entities compile and maintain large repositories of customer information such as, for example, customer transaction information across several accounts. To facilitate access to the customer information, the business entities often incorporate search functionalities into a variety of client facing interfaces such as, for example, a graphical user interface in a mobile application. Historically, conventional implementation of these search functionalities has resulted in varying degrees of success with respect to utility and ease of implementation.

One drawback of conventionally implementing the search functionalities is that in many instances, the search functionalities are limited to information within a particular platform such as, for example, a mobile application platform. As a result, output of a search request may not accurately reflect available information. In addition, customer experience may be adversely affected when several search requests made in different platforms are required to obtain desired information.

Therefore, there is a need to provide search functionalities as a service across a plurality of platforms via an application programming interface to facilitate identification of related information.

SUMMARY

The present disclosure, through one or more of its various aspects, embodiments, and/or specific features or sub-components, provides, inter alia, various systems, servers, devices, methods, media, programs, and platforms for providing search functionalities across a plurality of platforms via an application programming interface to facilitate identification of related information.

According to an aspect of the present disclosure, a method for providing search capabilities across a plurality of platforms to identify information from a plurality of related accounts is disclosed. The method is implemented by at least one processor. The method may include receiving, via an application programming interface, at least one request from a user interface, the at least one request may include a search string and a user profile; identifying at least one account identifier based on the user profile; associating the identified at least one account identifier with the at least one request; retrieving, from at least one networked repository, at least one indexed field based on the at least one request and the associated at least one account identifier; configuring the retrieved at least one indexed field for presentation via the user interface; and presenting, via the user interface, the configured at least one indexed field in response to the at least one request.

In accordance with an exemplary embodiment, the at least one request may include at least one from among a natural language request, a controlled vocabularies request, and a keyword request.

In accordance with an exemplary embodiment, the search string may relate to a transaction search and may include a combination of at least one from among a keyword, a numeric datum, and a search parameter that is entered by a user to find a result, the search parameter may include predetermined characters and predetermined commands that are used to narrow focus of a search action.

In accordance with an exemplary embodiment, the user interface may include at least one from among a graphical user interface and a multimedia user interface, the multimedia user interface may include a virtual assistant interface that utilizes artificial intelligence to perform tasks and services for a user based on natural language commands.

In accordance with an exemplary embodiment, the method may further include ingesting raw data from a plurality of sources, the raw data may include transaction data for a plurality of users; generating structured data in a predetermined file format based on the ingested raw data; indexing the structured data; and persisting, in the at least one networked repository, the indexed structured data, the indexed structured data may include the at least one indexed field.

In accordance with an exemplary embodiment, the raw data may be ingested in real-time from a plurality of sources based on an occurrence of an event.

In accordance with an exemplary embodiment, for the indexing, the method may further include receiving the structured data; filtering the structured data to remove at least one first character, the at least one first character may include a formatting character that relates to formatting instructions; tokenizing the filtered structured data to identify at least one textual unit; and filtering the at least one textual unit to remove at least one second character, the at least one second character may relate to at least one from among a stop word and a letter case.

In accordance with an exemplary embodiment, the method may further include receiving, via the application programming interface, at least one partial search string from the user interface; validating at least one user entitlement that is associated with the at least one partial search string; determining, by using a natural language processing technique, at least one predicted user intent; and mapping the at least one predicted user intent with corresponding user information according to the validated at least one user entitlement.

In accordance with an exemplary embodiment, the method may further include initiating a call to at least one data service to retrieve the corresponding user information based on the mapping; receiving at least one reply in response to the call; and presenting, via the user interface, the at least one reply.

In accordance with an exemplary embodiment, the call may be initiated by using an aggregation service via a content application programming interface that corresponds to each of the at least one data service to enable simultaneous processing of the call by the at least one data service.

According to an aspect of the present disclosure, a computing device configured to implement an execution of a method for providing search capabilities across a plurality of platforms to identify information from a plurality of related accounts is disclosed. The computing device comprising a processor; a memory; and a communication interface coupled to each of the processor and the memory, wherein the processor may be configured to receive, via an application programming interface, at least one request from a user interface, the at least one request may include a search string and a user profile; identify at least one account identifier based on the user profile; associate the identified at least one account identifier with the at least one request; retrieve, from at least one networked repository, at least one indexed field based on the at least one request and the associated at least one account identifier; configure the retrieved at least one indexed field for presentation via the user interface; and present, via the user interface, the configured at least one indexed field in response to the at least one request.

In accordance with an exemplary embodiment, the at least one request may include at least one from among a natural language request, a controlled vocabularies request, and a keyword request.

In accordance with an exemplary embodiment, the search string may relate to a transaction search and may include a combination of at least one from among a keyword, a numeric datum, and a search parameter that is entered by a user to find a result, the search parameter may include predetermined characters and predetermined commands that are used to narrow focus of a search action.

In accordance with an exemplary embodiment, the user interface may include at least one from among a graphical user interface and a multimedia user interface, the multimedia user interface may include a virtual assistant interface that utilizes artificial intelligence to perform tasks and services for a user based on natural language commands.

In accordance with an exemplary embodiment, the processor may be further configured to ingest raw data from a plurality of sources, the raw data may include transaction data for a plurality of users; generate structured data in a predetermined file format based on the ingested raw data; index the structured data; and persist, in the at least one networked repository, the indexed structured data, the indexed structured data may include the at least one indexed field.

In accordance with an exemplary embodiment, the processor may be further configured to ingest the raw data in real-time from a plurality of sources based on an occurrence of an event.

In accordance with an exemplary embodiment, for the indexing, the processor may be further configured to receive the structured data; filter the structured data to remove at least one first character, the at least one first character may include a formatting character that relates to formatting instructions; tokenize the filtered structured data to identify at least one textual unit; and filter the at least one textual unit to remove at least one second character, the at least one second character may relate to at least one from among a stop word and a letter case.

In accordance with an exemplary embodiment, the processor may be further configured to receive, via the application programming interface, at least one partial search string from the user interface; validate at least one user entitlement that is associated with the at least one partial search string; determine, by using a natural language processing technique, at least one predicted user intent; and map the at least one predicted user intent with corresponding user information according to the validated at least one user entitlement.

In accordance with an exemplary embodiment, the processor may be further configured to initiate a call to at least one data service to retrieve the corresponding user information based on the mapping; receive at least one reply in response to the call; and present, via the user interface, the at least one reply.

In accordance with an exemplary embodiment, the processor may be further configured to initiate the call by using an aggregation service via a content application programming interface that corresponds to each of the at least one data service to enable simultaneous processing of the call by the at least one data service.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
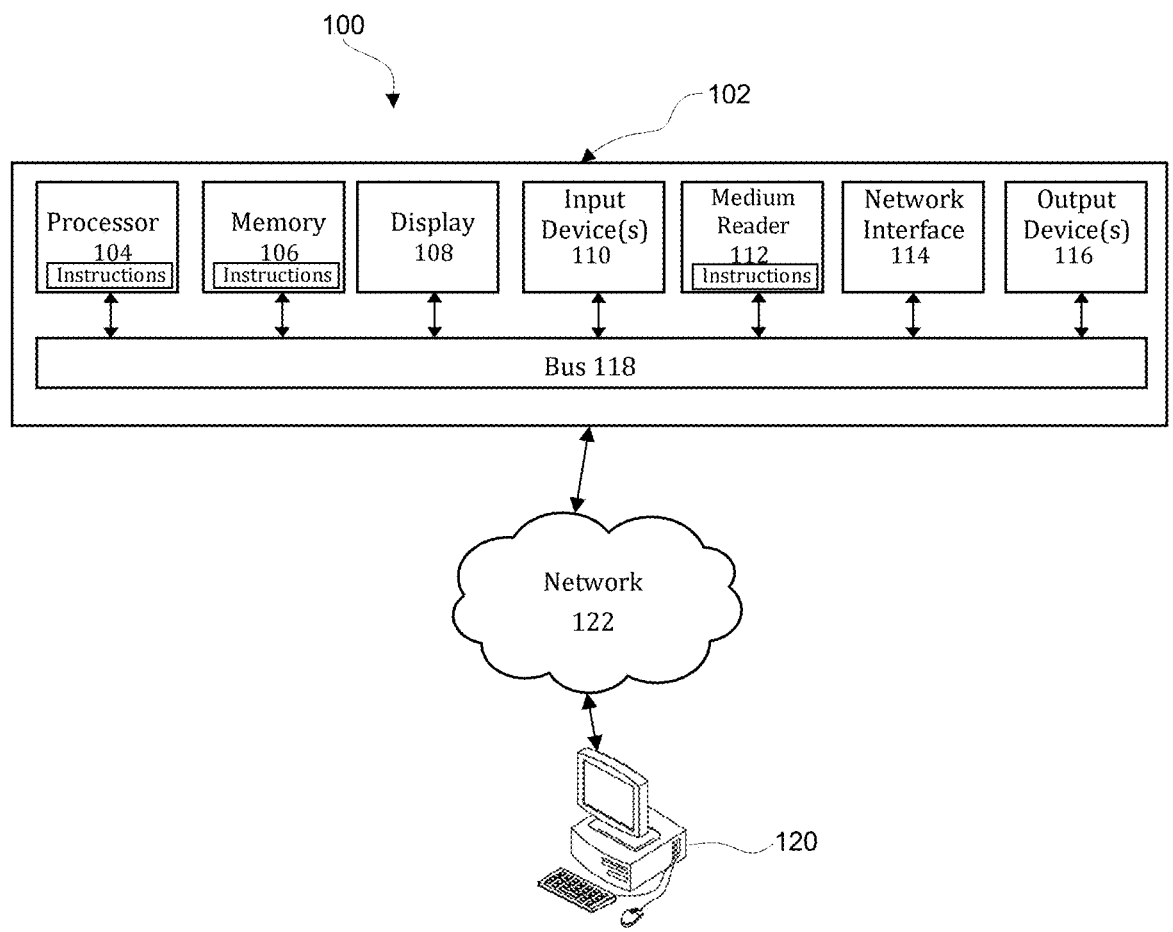
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing search functionalities across a plurality of platforms via an application programming interface to facilitate identification of related information.

Figure 2:
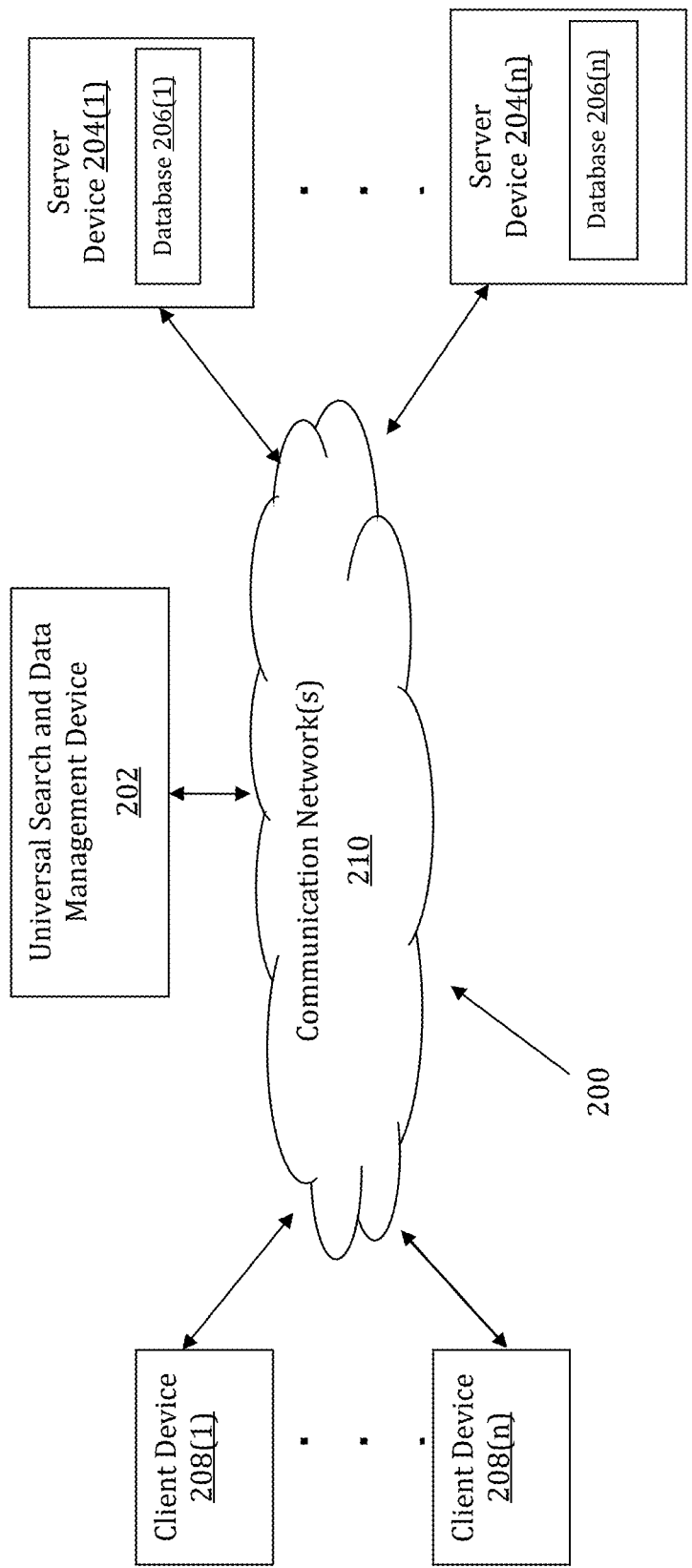
FIG. 2 illustrates an exemplary diagram of a network environment.

Referring to FIG. 2, a schematic of an exemplary network environment 200 for implementing a method for providing search functionalities across a plurality of platforms via an application programming interface to facilitate identification of related information is illustrated. In an exemplary embodiment, the method is executable on any networked computer platform, such as, for example, a personal computer (PC).

The method for providing search functionalities across a plurality of platforms via an application programming interface to facilitate identification of related information may be implemented by a Universal Search and Data Management (USDM) device 202. The USDM device 202 may be the same or similar to the computer system 102 as described with respect to FIG. 1. The USDM device 202 may store one or more applications that can include executable instructions that, when executed by the USDM device 202, cause the USDM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the USDM device 202 itself, may be located in virtual server(s) running in a cloud-based computing environment rather than being tied to one or more specific physical network computing devices. Also, the application(s) may be running in one or more virtual machines (VMs) executing on the USDM device 202. Additionally, in one or more embodiments of this technology, virtual machine(s) running on the USDM device 202 may be managed or supervised by a hypervisor.

In the network environment 200 of FIG. 2, the USDM device 202 is coupled to a plurality of server devices 204(1)-204(n) that hosts a plurality of databases 206(1)-206(n), and also to a plurality of client devices 208(1)-208(n) via communication network(s) 210. A communication interface of the USDM device 202, such as the network interface 114 of the computer system 102 of FIG. 1, operatively couples and communicates between the USDM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the USDM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and USDM devices that efficiently implement a method for providing search functionalities across a plurality of platforms via an application programming interface to facilitate identification of related information.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The USDM device 202 may be a standalone device or integrated with one or more other devices or apparatuses, such as one or more of the server devices 204(1)-204(n), for example. In one particular example, the USDM device 202 may include or be hosted by one of the server devices 204(1)-204(n), and other arrangements are also possible. Moreover, one or more of the devices of the USDM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the USDM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to request data, account identifier data, indexed data, natural language data, controlled vocabularies data, keyword data, raw data, and structured data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the USDM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the USDM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the USDM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the USDM device 202, the server devices 204(1)-204(n), or the client devices 208(1)-208(n), for example, may be configured to operate as virtual instances on the same physical machine. In other words, one or more of the USDM device 202, the server devices 204(1)-204(n), or the client devices 208(1)-208(n) may operate on the same physical device rather than as separate devices communicating through communication network(s) 210. Additionally, there may be more or fewer USDM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
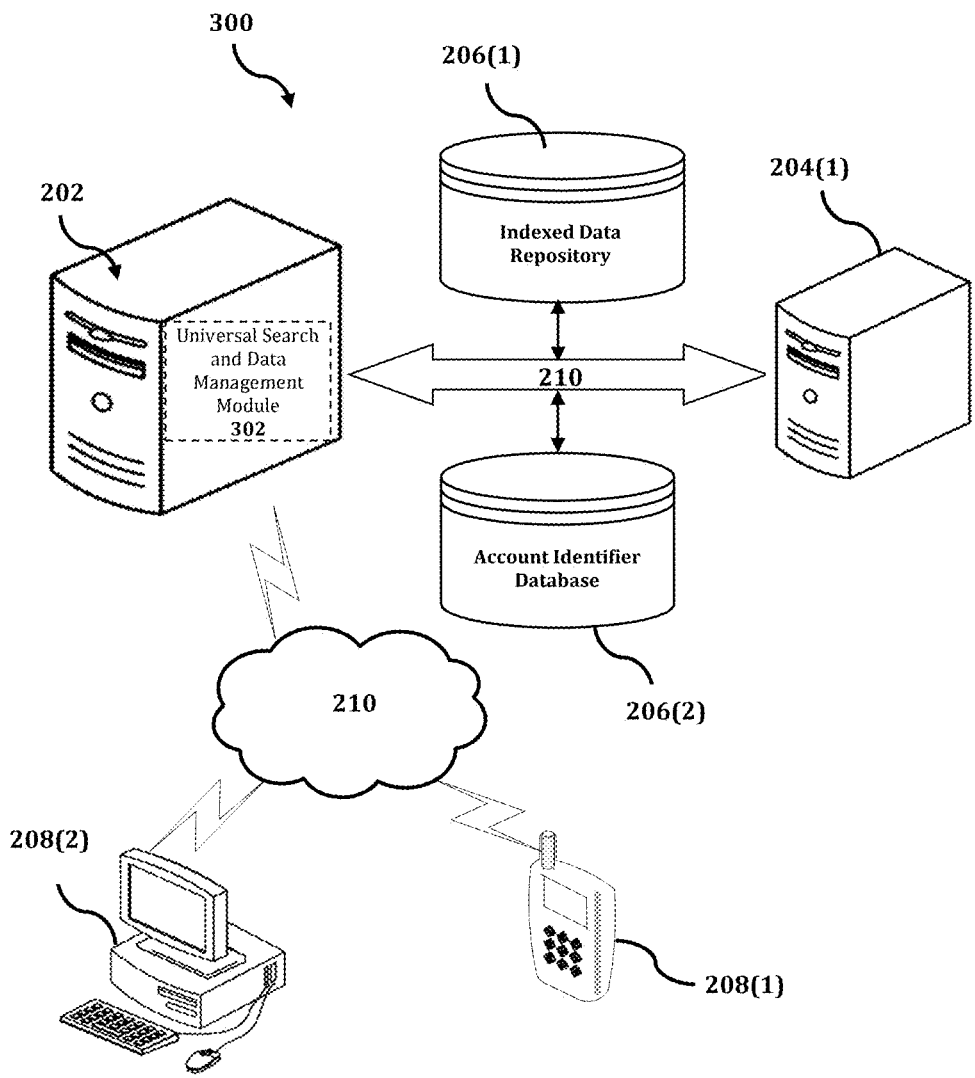
FIG. 3 shows an exemplary system for implementing a method for providing search functionalities across a plurality of platforms via an application programming interface to facilitate identification of related information.

The USDM device 202 is described and shown in FIG. 3 as including a universal search and data management module 302, although it may include other rules, policies, modules, databases, or applications, for example. As will be described below, the universal search and data management module 302 is configured to implement a method for providing search functionalities across a plurality of platforms via an application programming interface to facilitate identification of related information.

An exemplary process 300 for implementing a mechanism for providing search functionalities across a plurality of platforms via an application programming interface to facilitate identification of related information by utilizing the network environment of FIG. 2 is shown as being executed in FIG. 3. Specifically, a first client device 208(1) and a second client device 208(2) are illustrated as being in communication with USDM device 202. In this regard, the first client device 208(1) and the second client device 208(2) may be "clients" of the USDM device 202 and are described herein as such. Nevertheless, it is to be known and understood that the first client device 208(1) and/or the second client device 208(2) need not necessarily be "clients" of the USDM device 202, or any entity described in association therewith herein. Any additional or alternative relationship may exist between either or both of the first client device 208(1) and the second client device 208(2) and the USDM device 202, or no relationship may exist.

Further, USDM device 202 is illustrated as being able to access an indexed data repository 206(1) and an account identifier database 206(2). The universal search and data management module 302 may be configured to access these databases for implementing a method for providing search functionalities across a plurality of platforms via an application programming interface to facilitate identification of related information.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the USDM device 202 via broadband or cellular communication. Of course, these embodiments are merely exemplary and are not limiting or exhaustive.

Upon being started, the universal search and data management module 302 executes a process for providing search functionalities across a plurality of platforms via an application programming interface to facilitate identification of related information. An exemplary process for providing search functionalities across a plurality of platforms via an application programming interface to facilitate identification of related information is generally indicated at flowchart 400 in FIG. 4.

Figure 4:
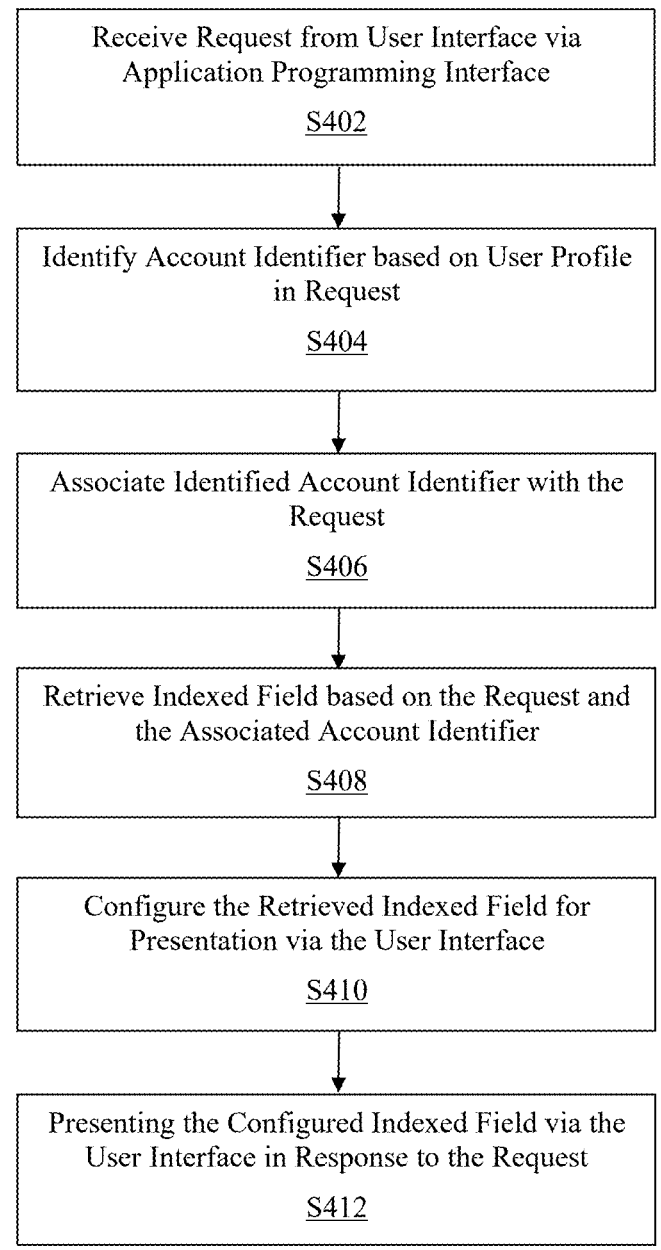
FIG. 4 is a flowchart of an exemplary process for implementing a method for providing search functionalities across a plurality of platforms via an application programming interface to facilitate identification of related information.

In the process 400 of FIG. 4, at step S402, a request may be received from a user interface via an application programming interface. The request may include a search string and user profile information. In an exemplary embodiment, the request may include at least one from among a natural language request, a controlled vocabularies request, and a keyword request. The natural language request may include an inquiry that is made in a natural language structure such as, for example, a sentence structure. For example, the natural language request may include a question relating to a total amount spent on coffee this month.

The controlled vocabularies request may relate to a use of predefined, authorized terms that have been preselected by designers of an indexing scheme. For example, the controlled vocabularies request may include a specific combination of April and transaction to identify transaction information for a particular month. The keyword request may include an index term that captures the essence of topics within an electronic document. As will be appreciated by a person of ordinary skill in the art, a controlled vocabulary may correspond to index terms within a collection of electronic documents.

In another exemplary embodiment, the search string may relate to a transaction search and may include a combination of at least one from among a keyword, a numeric datum, and a search parameter that is entered by a user to find a result. The search parameter may include predetermined characters and predetermined commands that are used to narrow focus of a search action. For example, an asterisk search parameter may be utilized as a wildcard symbol that broadens a search by finding words that start with the same letters. As will be appreciated by a person of ordinary skill in the art, the transaction search may relate to any instance of buying and/or selling. For example, the transaction search may relate to a coffee purchase at a coffee shop as well as an investment vehicle purchase from a financial broker.

In another exemplary embodiment, the user interface may include at least one from among a graphical user interface and a multimedia user interface. The graphical user interface may correspond to a form of user interface that allows users to interact with electronic devices through audio indicators and graphical icons such as, for example, a primary notation instead of text-based user interfaces, typed command labels, and/or text navigation. The multimedia user interface may include a virtual assistant interface that utilizes artificial intelligence to perform tasks and services for a user based on natural language commands. The multimedia user interface may correspond to a software agent that can perform tasks and/or services for an individual based on commands and/or questions such as, for example, AMAZON's ALEXA and APPLE's SIRI.

At step S404, an account identifier may be identified based on the user profile information. In an exemplary embodiment, the account identifier corresponding to the user profile information in the request may be identified in a networked account utility such as, for example, an enhanced transaction utility. The account identifier may include a sequence of characters such as, for example, textual letters and symbols that are associated with a particular customer. The sequence of characters may be utilized to identify and/or refer to the particular customer in a data storage schema of the networked account utility. In another exemplary embodiment, the account identifier may be associated with the particular customer and contain information relating to all accounts that belong to the particular customer.

At step S406, the account identifier may be associated with the request. In an exemplary embodiment, the association may be appended to the request. For example, the association may be added to the data file of the request and/or added to the metadata file that corresponds to the request. In another exemplary embodiment, the association may be stored in a networked repository based on a predetermine requirement such as, for example, a future auditing requirement for the request.

At step S408, an indexed field may be retrieved from a networked repository based on the request and the associated account identifier. In an exemplary embodiment, a search engine based on a software library such as, for example, a LUCENE library may be utilized to identify and retrieve the indexed field. The search engine may relate to a distributed, multitenant-capable full-text search engine that utilizes a web protocol interface such as, for example, a hypertext transfer protocol (HTTP) web interface and a schema-free file format such as, for example, a JavaScript Object Notation (JSON) documents format. The search engine may process textual data, numerical data, geospatial data, structured data, and unstructured data.

At step S410, the retrieved indexed field may be configured for presentation via the user interface. The indexed field may be configured based on information relating to the user interface that is extracted from the request. In an exemplary embodiment, the retrieved indexed field may be configured to be displayable on a graphical user interface that corresponds to the received request. The graphical user interface may relate to a visual process for interacting with a computer by using items such as, for example, windows, icons, and menus. For example, the retrieved indexed field may be configured to be displayable via a chat interface of a mobile application.

In another exemplary embodiment, the retrieved indexed field may be configured to be presentable via an artificial intelligence digital assistant such as, for example, AMAZON ALEXA and APPLE SIRI. For example, the retrieved indexed field may be configured to be audibly presented in a natural language format as an answer to a natural language question via the digital assistant. Then, at step S412, the configured indexed field may be presented via the user interface in response to the request.

In another exemplary embodiment, raw data may be ingested and indexed based on a predetermined mapping to facilitate the retrieval of information by the search engine. The raw data may be ingested from a plurality of sources such as, for example, first party sources and third-party sources. In another exemplary embodiment, the raw data may include transaction data for a plurality of users. The raw data may be ingested in real-time from a plurality of sources based on an occurrence of an event. Structured data in a predetermined file format may then be generated based on the ingested raw data. In another exemplary embodiment, the predetermined file format may include an open standard file format and a data interchange format such as, for example, a JSON file format that uses human-readable text to store and transmit data objects consisting of attribute-value pairs and array data types.

Then, the structured data may be indexed. In another exemplary embodiment, the indexing process may include filtering the structured data to remove a first character. The first character may include a formatting character that relates to formatting instructions. For example, the first character may relate to a hypertext markup language (HTML) instruction to format the structured data. The indexing process may also include tokenizing the filtered structured data to identify a textual unit. For example, the tokenizing of the filtered structured data may relate to the identifying and separating of a sentence into individual words. The indexing process may then filter the textual unit to remove a second character. The second character may relate to a frequently occurring stop word such as, for example, the word "the" and a letter case such as, for example, an upper-case letter.

Finally, the indexed structured data may be persisted in the networked repository. In an exemplary embodiment, the indexed structured data may be persisted in the networked repository based on a predetermined time period. For example, credit card transaction data for a plurality of users may be persisted in the networked repository for ninety (90) days. In another exemplary embodiment, the indexed structured data may be automatically purged from the networked repository based on the predetermined time period. For example, the credit card transaction data for the plurality of users may be purged from the networked repository after expiration of the ninety (90) day period. In another exemplary embodiment, a time stamp may be associated with the indexed structured data to facilitate utilization of the predetermined time period. The time stamp may correspond to a time when the structured data was indexed in the networked repository. As will be appreciated by a person of ordinary skill in the art, the indexed structured data may include the indexed field consistent with disclosures in the present application.

In another exemplary embodiment, the request may be further processed to identify missing text and user intent. To identify missing text from a partial search string in the request, analyzers such as, for example, Ngram analyzers and Egram analyzers may be utilized to predict a complete search string based on the provided partial search string. To identify user intent from a partial search string in the request, user entitlements that are associated with the partial search string may first be validated. The user entitlements may be validated to ensure that adequate information is provided to the user. For example, a primary account holder may access all data relating to the account while a secondary user may be limited to transaction data that is associated with the secondary user.

After the user entitlements are validated, a predicted user intent may be determined by using a natural language processing technique. For example, a customer searching for a particular coffee shop may intend to retrieve transaction information relating to the coffee shop for the past seven (7) days as well as access investment information corresponding to the coffee shop. Then, the predicted user intent may be mapped with corresponding user information according to the validated user entitlements. In another exemplary embodiment, a call to a data service may be initiated to retrieve the corresponding user information based on the mapping. A reply in response to the call may be received and presented via the user interface consistent with disclosures in the present application. In another exemplary embodiment, the call may be initiated by using an aggregation service via a content application programming interface (API) that corresponds to each of a plurality of data services to enable simultaneous processing of the call by the data service. For example, the aggregation service may initiate simultaneous calls to a transaction data service and a bill pay data service and receive simultaneous responses in reply.

Figure 5:
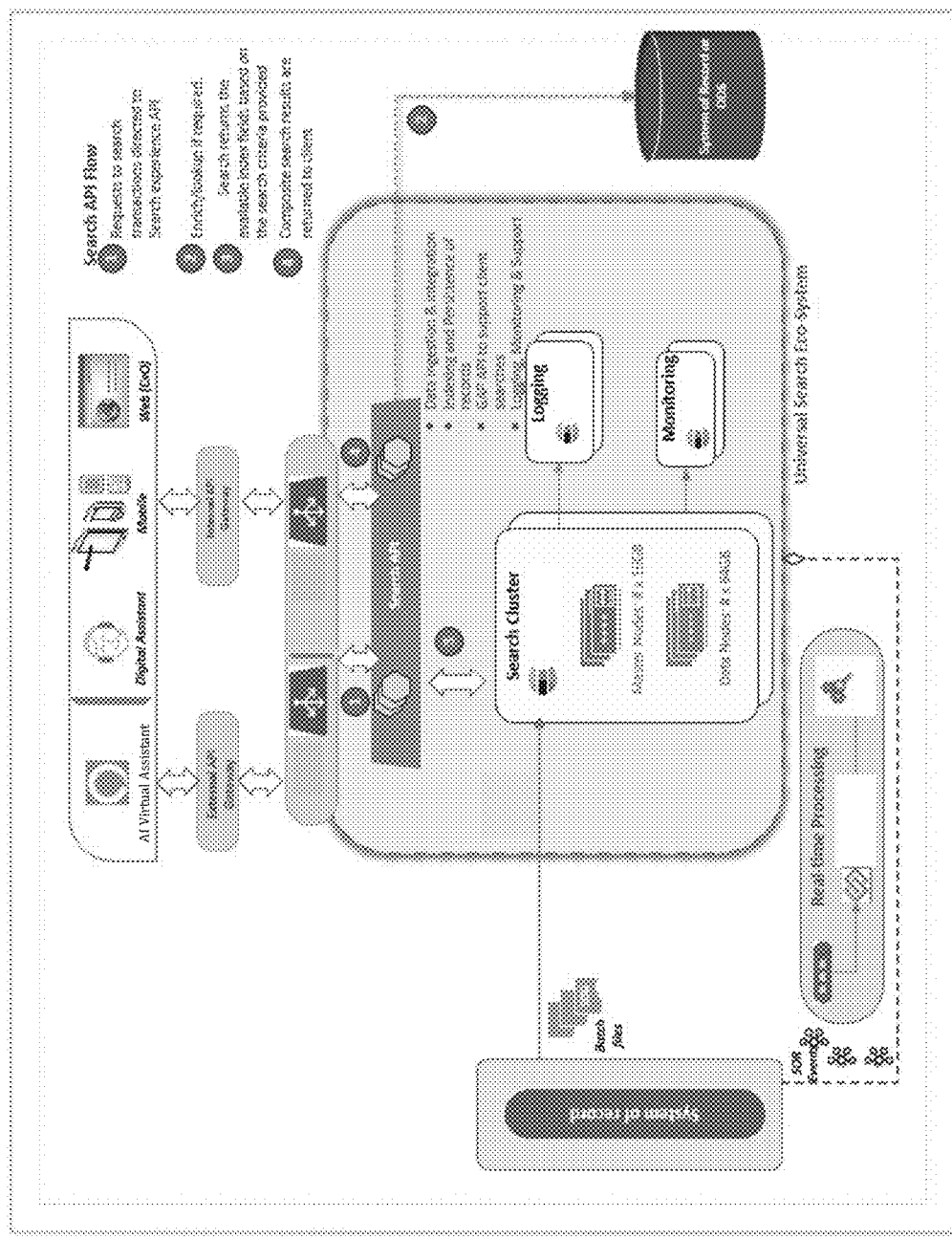
FIG. 5 is an architectural diagram of an exemplary process for implementing a method for providing search functionalities across a plurality of platforms via an application programming interface to facilitate identification of related information.

FIG. 5 is an architectural diagram 500 of an exemplary process for implementing a method for providing search functionalities across a plurality of platforms via an application programming interface to facilitate identification of related information. As illustrated in FIG. 5, at step 1, search requests for transactions are directed to an API. The requests may be received from an external API gateway as well as from an internal API gateway. At step 2, the user identifiers corresponding to the requests are identified and associated with the requests. At step 3, a search process consistent with disclosures in the present application may be performed and available indexed fields are returned based on the provided search criteria in the requests. Then, at step 4, composite search results are returned to the client in response to the requests. Additionally, the search results may be logged and monitored.

Figure 6:
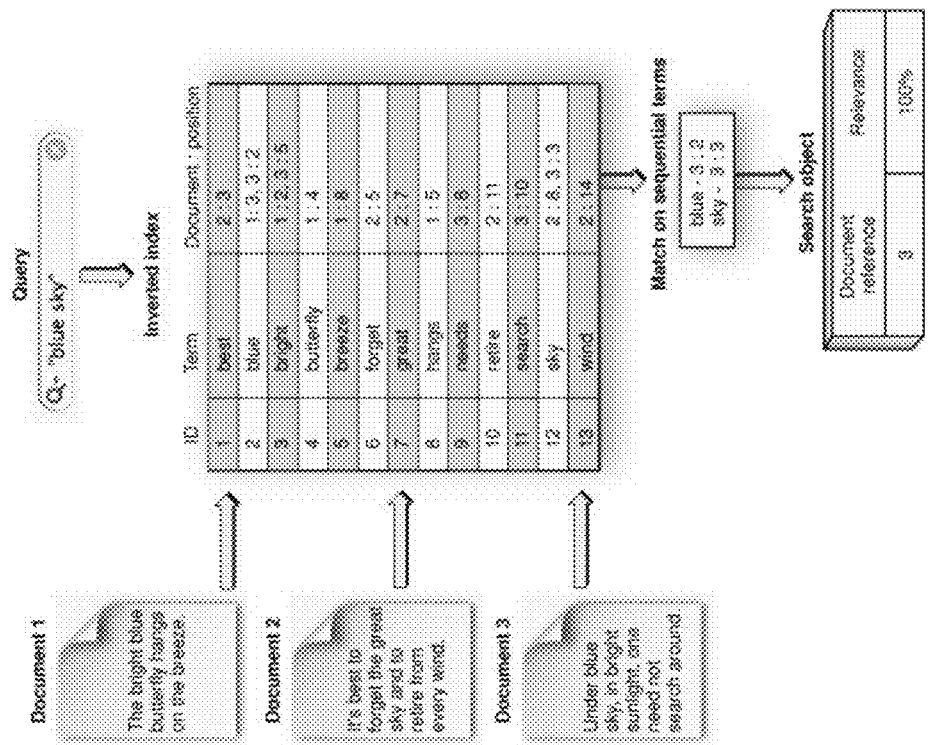
FIG. 6 is a diagram of an exemplary search process for implementing a method for providing search functionalities across a plurality of platforms via an application programming interface to facilitate identification of related information.

FIG. 6 is a diagram 600 of an exemplary search process for implementing a method for providing search functionalities across a plurality of platforms via an application programming interface to facilitate identification of related information. As illustrated in FIG. 6, a plurality of documents such as, for example, documents 1, 2, and 3 may be indexed to generate an inverted index table. A search string titled "blue sky" may be processed consistent with disclosures in the present application and matched to an indexed document based on sequential terms. The search may return a search object indicating the relevance percentage for the matched indexed document.

Figure 7:
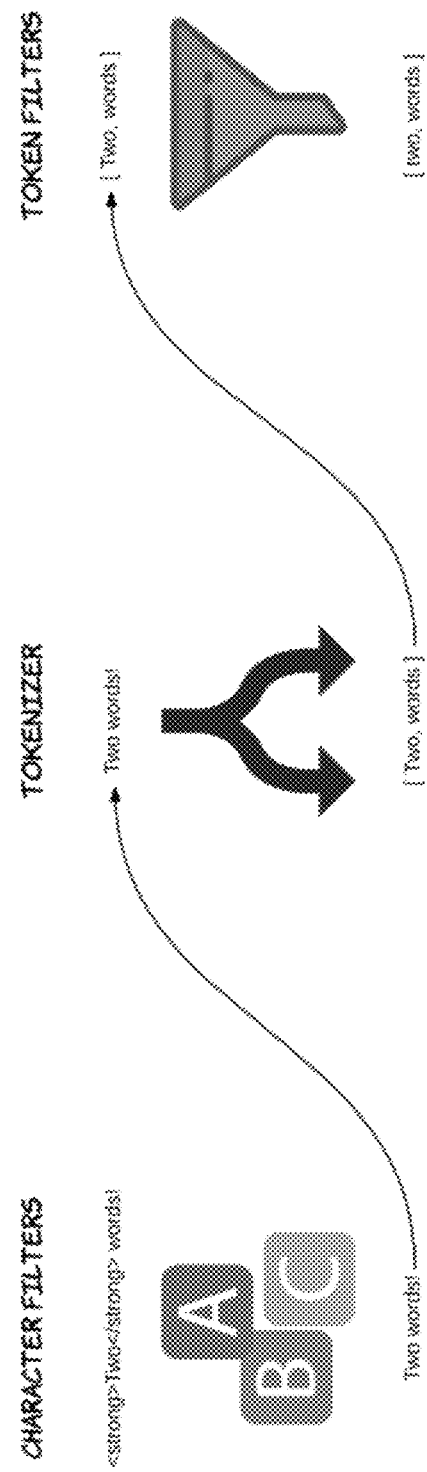
FIG. 7 is a diagram of an exemplary indexing process for implementing a method for providing search functionalities across a plurality of platforms via an application programming interface to facilitate identification of related information.

FIG. 7 is a diagram 700 of an exemplary indexing process for implementing a method for providing search functionalities across a plurality of platforms via an application programming interface to facilitate identification of related information. As illustrated in FIG. 7, the indexing process may include filtering the structured data to remove a first character. The first character may include a formatting character that relates to formatting instructions. For example, the first character may relate to a hypertext markup language (HTML) instruction such as "<strong>" to format the structured data. The indexing process may also include tokenizing the filtered structured data to identify a textual unit. For example, the tokenizing of the filtered structured data may relate to the identifying and separating of a sentence into individual words. The indexing process may then filter the textual unit to remove a second character. The second character may relate to a frequently occurring stop word such as, for example, the word "the" and a letter case such as, for example, an upper-case letter.

Figure 8:
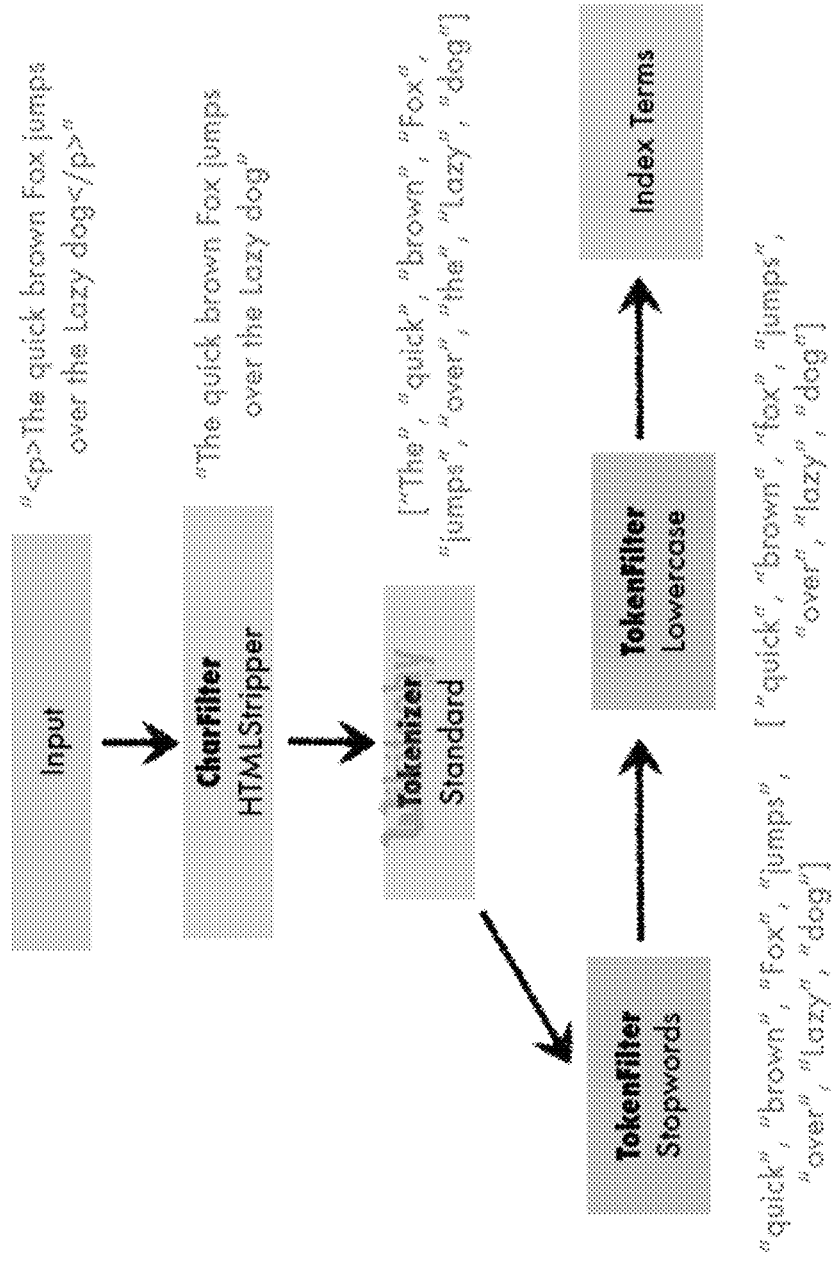
FIG. 8 is an in-depth diagram of an exemplary indexing process for implementing a method for providing search functionalities across a plurality of platforms via an application programming interface to facilitate identification of related information.

FIG. 8 is an in-depth diagram 800 of an exemplary indexing process for implementing a method for providing search functionalities across a plurality of platforms via an application programming interface to facilitate identification of related information. As illustrated in FIG. 8, the indexing process may include filtering the structured data to remove a first character. The first character may include a formatting character that relates to formatting instructions. For example, the first character may relate to a hypertext markup language (HTML) instruction such as "<p>" to format the structured data. The indexing process may also include tokenizing the filtered structured data to identify a textual unit. For example, the tokenizing of the filtered structured data may relate to the identifying and separating of a sentence into individual words. The indexing process may then filter the textual unit to remove a second character. The second character may relate to a frequently occurring stop word such as, for example, "the" and a letter case such as, for example, an upper-case letter.

Figure 9:
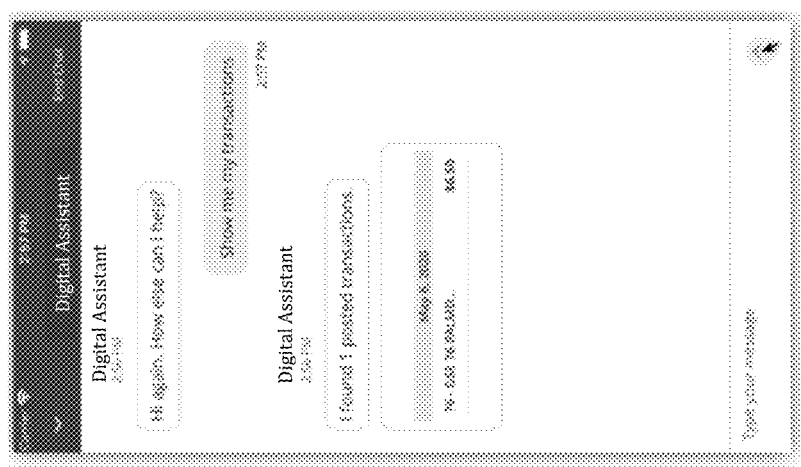
FIG. 9 is a screen shot that illustrates a graphical user interface of a digital assistant that is usable for implementing a method for providing search functionalities across a plurality of platforms via an application programming interface to facilitate identification of related information, according to an exemplary embodiment.

FIG. 9 is a screen shot 900 that illustrates a graphical user interface of a digital assistant that is usable for implementing a method for providing search functionalities across a plurality of platforms via an application programming interface to facilitate identification of related information, according to an exemplary embodiment. As illustrated in FIG. 9, a user may request information from a digital assistant via a chat interface. The user may request to view transactions that are associated with the user. Consistent with disclosures in the present application, the digital assistant may process the request to identify a transaction and display the identified transaction via the chat interface for the user.

Figure 10:
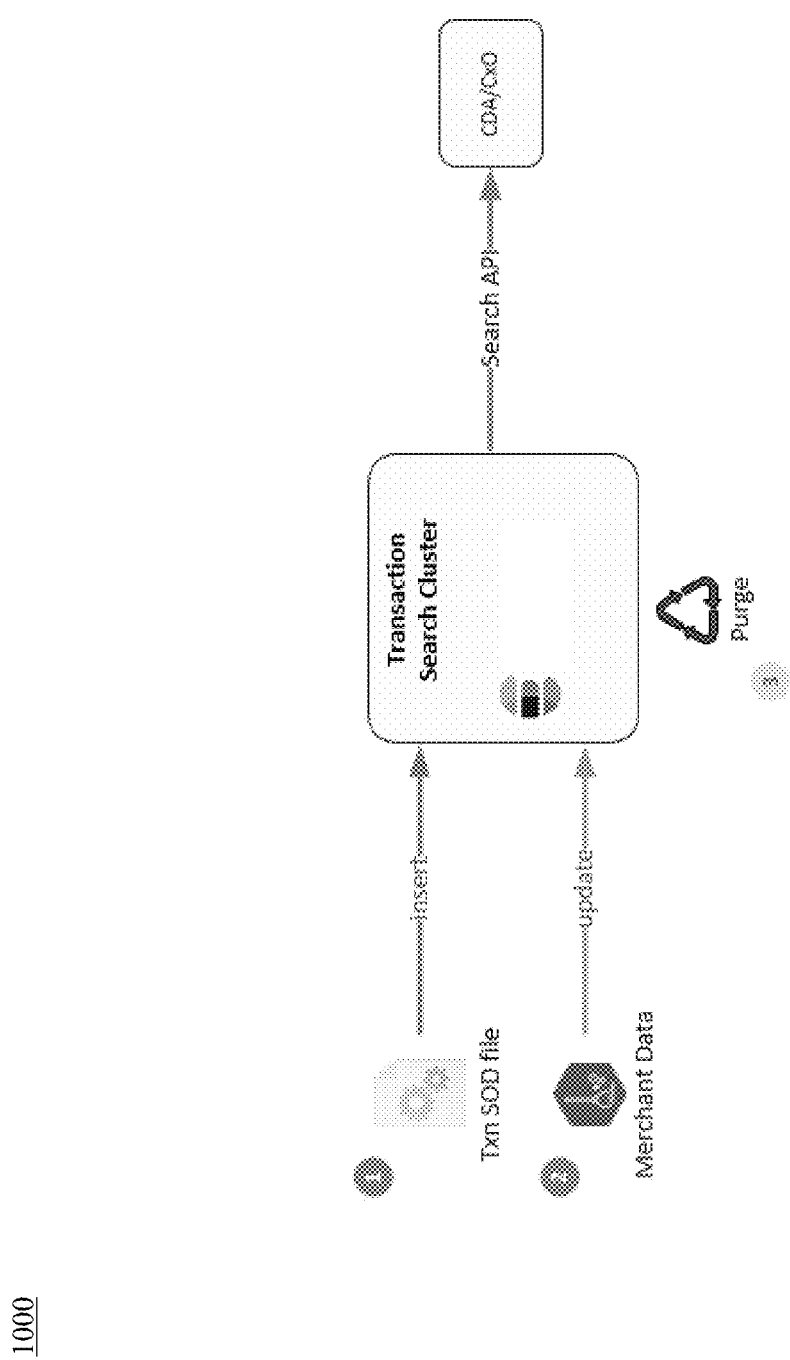
FIG. 10 is a diagram of an exemplary transaction searching process for implementing a method for providing search functionalities across a plurality of platforms via an application programming interface to facilitate identification of related information.

FIG. 10 is a diagram 1000 of an exemplary transaction searching process for implementing a method for providing search functionalities across a plurality of platforms via an application programming interface to facilitate identification of related information. As illustrated in FIG. 10, at step 1, the ingestion process may include the addition of new transactions into a data file which is inserted into a transaction search cluster. At step 2, merchant information may be updated in the transaction search cluster based on the data file. Then, at step 3, transactions that are more than ninety (90) days old may be purged from the transaction search cluster.

Figure 11:
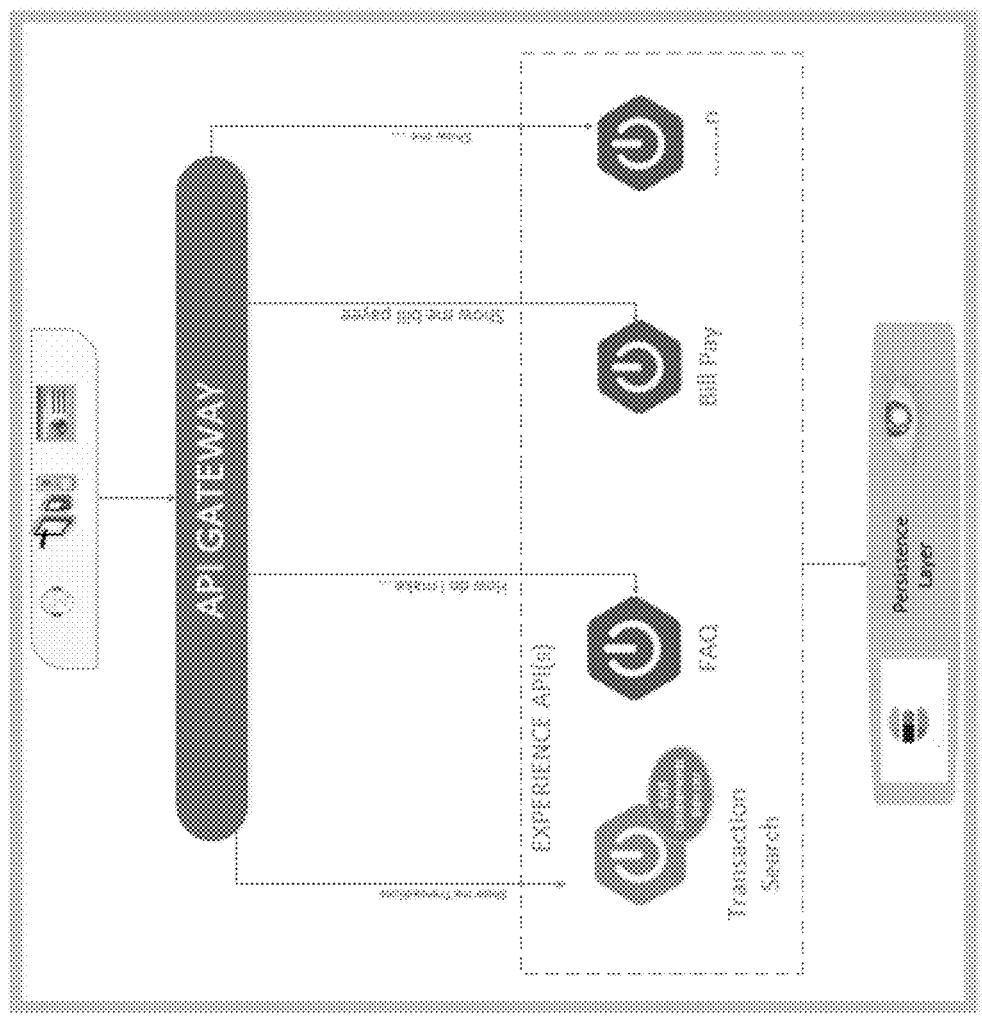
FIG. 11 is an application programming interface architecture diagram of an exemplary process for implementing a method for providing search functionalities across a plurality of platforms via an application programming interface to facilitate identification of related information.

FIG. 11 is an application programming interface architecture diagram 1100 of an exemplary process for implementing a method for providing search functionalities across a plurality of platforms via an application programming interface to facilitate identification of related information. As illustrated in FIG. 11, an API gateway may be utilized to direct search queries to an appropriate data service. The data service may include a transaction search data service, a frequently asked questions (FAQ) data service, a bill pay data service, as well as any other compatible data services. The data services may then access the persistence layer to retrieve information for the search queries. As will be appreciated by a person of ordinary skill in the art, the aggregation service may initiate simultaneous calls to a transaction data service and a bill pay data service and receive simultaneous responses in reply.

Figure 12:
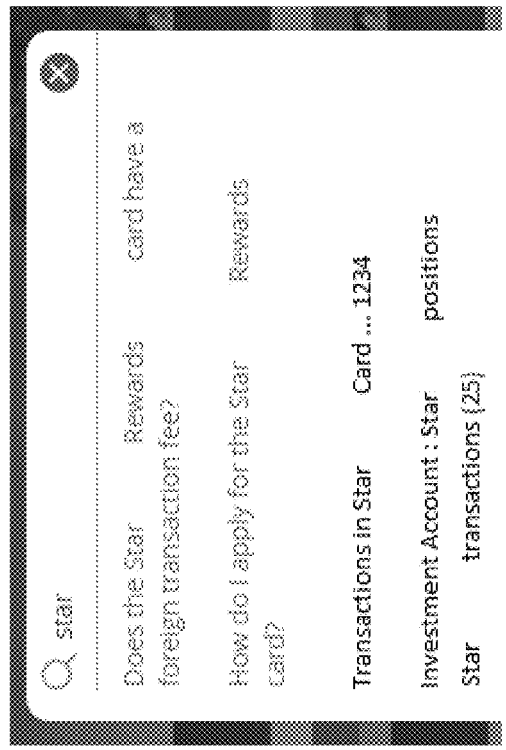
FIG. 12 is a screen shot that illustrates a graphical user interface of customer intent that is usable for implementing a method for providing search functionalities across a plurality of platforms via an application programming interface to facilitate identification of related information, according to an exemplary embodiment.

FIG. 12 is a screen shot 1200 that illustrates a graphical user interface of customer intent that is usable for implementing a method for providing search functionalities across a plurality of platforms via an application programming interface to facilitate identification of related information, according to an exemplary embodiment. As illustrated in FIG. 12, the user has provided a partial search string. Consistent with disclosures in the present application, a user intent is identified and corresponding information across accounts and platforms is presented in response to the partial search string.

Figure 13:
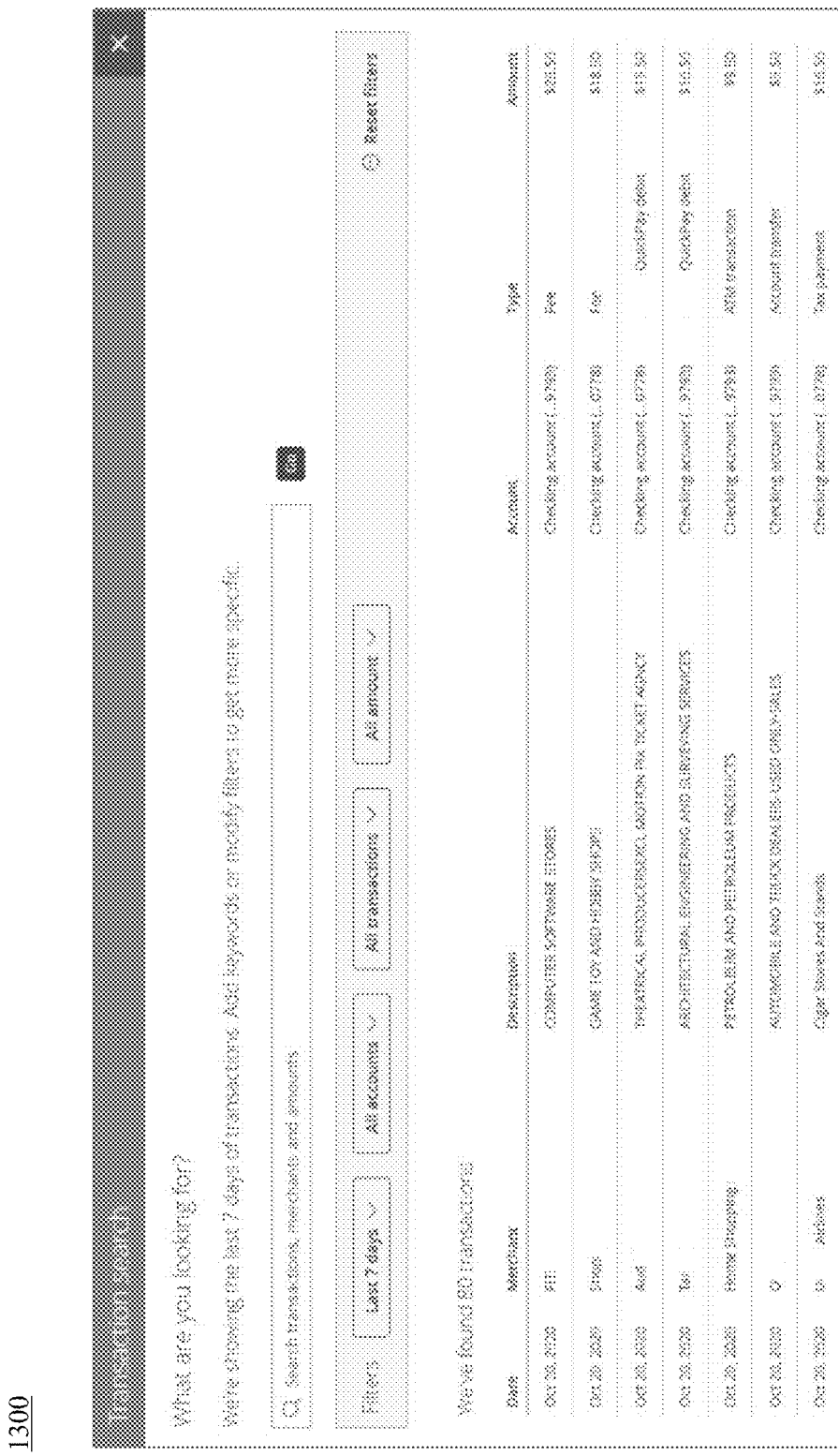
FIG. 13 is a screen shot that illustrates a web user interface that is usable for implementing a method for providing search functionalities across a plurality of platforms via an application programming interface to facilitate identification of related information, according to an exemplary embodiment.

FIG. 13 is a screen shot 1300 that illustrates a web user interface that is usable for implementing a method for providing search functionalities across a plurality of platforms via an application programming interface to facilitate identification of related information, according to an exemplary embodiment. As illustrated in FIG. 13, a search bar is provided in a web user interface. A graphical component in a tabular format may be presented to structure responses to an initiated inquiry. Additionally, selectable graphical elements may also be provided to enable the filtering of the responses based on a time period, an account, a transaction, and an amount.

Figure 14:
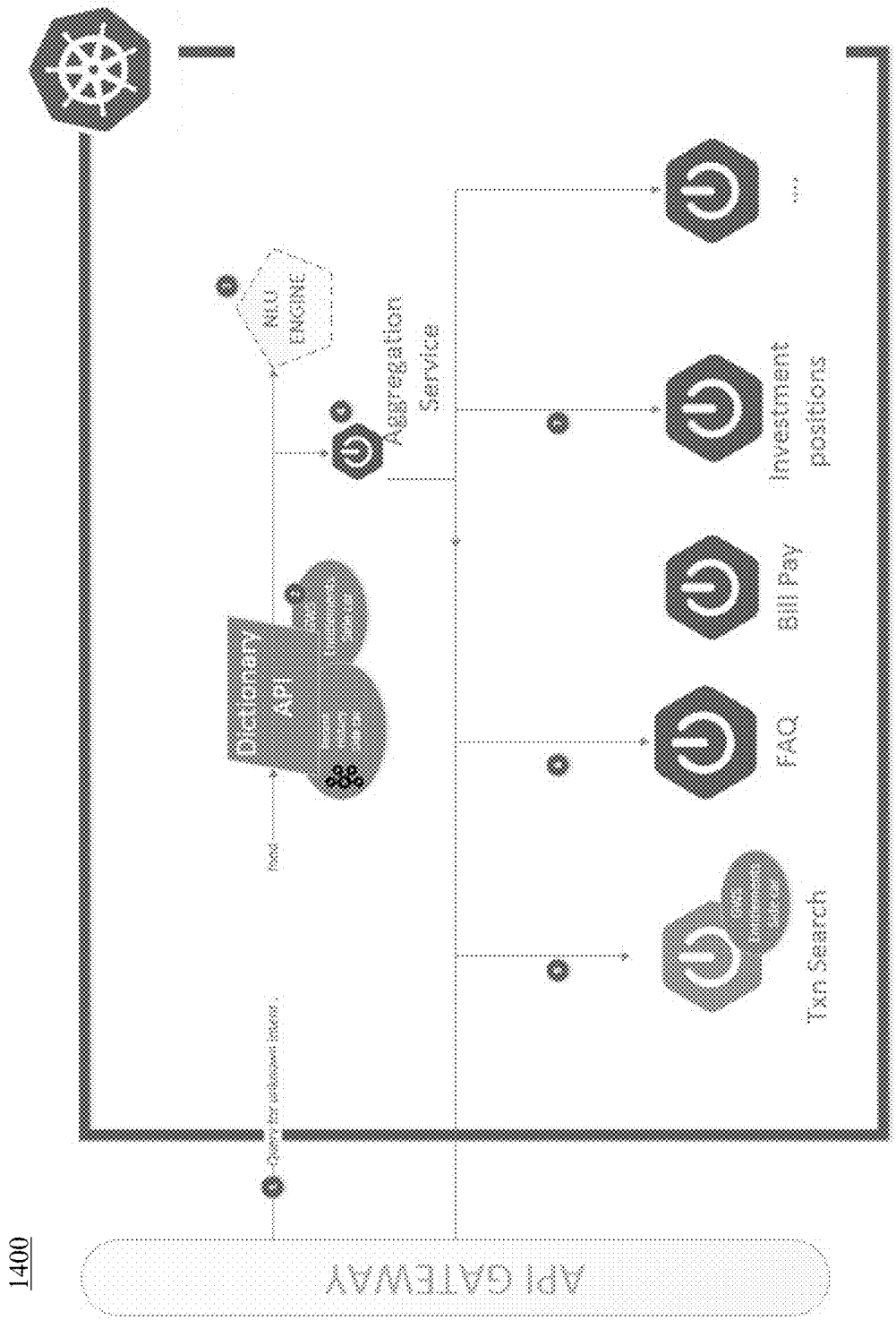
FIG. 14 is an index dictionary diagram of an exemplary process for implementing a method for providing search functionalities across a plurality of platforms via an application programming interface to facilitate identification of related information.

FIG. 14 is an index dictionary diagram 1400 of an exemplary process for implementing a method for providing search functionalities across a plurality of platforms via an application programming interface to facilitate identification of related information. As illustrated in FIG. 14, an API gateway may receive a query for an unknown intent at step 1. At step 2, user entitlements may be validated by using an entitlements side car as well as a recent history side car that is connected to a dictionary API. At step 3, a natural language processing engine may be utilized to determine an intent of the query and to map the query to an API that is associated with a data service. At step 4, the mapped query is passed to an aggregation service which initiates three different requests to 3 different data services. At step 5, the aggregation service initiates a first request to a transaction search data service based on the validated entitlements. At step 6, the aggregation service initiates a second request to a frequently asked question (FAQ) data service. At step 7, the aggregation service initiates a third request to an investment positions data service.

Figure 15:
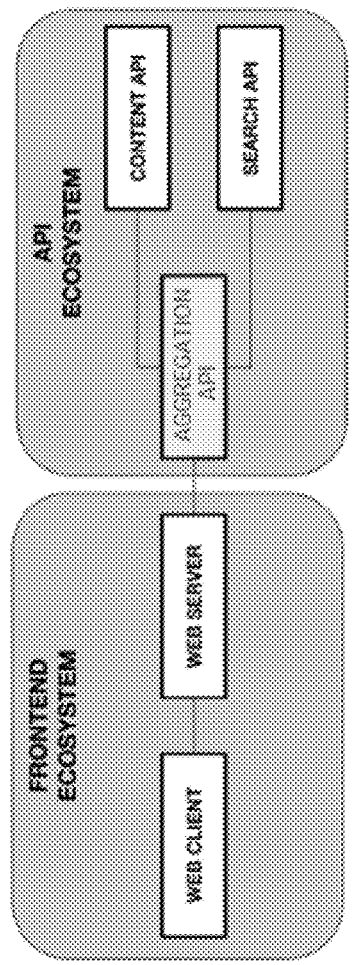
FIG. 15 is an aggregation architecture diagram of an exemplary process for implementing a method for providing search functionalities across a plurality of platforms via an application programming interface to facilitate identification of related information.

FIG. 15 is an aggregation architecture diagram 1500 of an exemplary process for implementing a method for providing search functionalities across a plurality of platforms via an application programming interface to facilitate identification of related information. As illustrated in FIG. 15, the API ecosystem may be operatively connected to a front-end ecosystem. The front-end ecosystem may include a web client where a request may be received and a web server that connects the front-end ecosystem with the API ecosystem. The API ecosystem may include an aggregation API that is connected to a search API to process the request consistent with disclosures in the present application and a content API to retrieve corresponding data based on output from the search API.

Accordingly, with this technology, an optimized process for providing search functionalities across a plurality of platforms via an application programming interface to facilitate identification of related information is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing search capabilities across a plurality of platforms to identify information from a plurality of related accounts, the method being implemented by at least one processor, the method comprising:
   receiving, by the at least one processor via an application programming interface, at least one request from a user interface, the at least one request including a search string and a user profile;
   identifying, by the at least one processor, at least one account identifier based on the user profile;
   associating, by the at least one processor, the identified at least one account identifier with the at least one request;
   retrieving, by the at least one processor from at least one networked repository, at least one indexed field based on the at least one request and the associated at least one account identifier;
   configuring, by the at least one processor, the retrieved at least one indexed field for presentation via the user interface; and
   presenting, by the at least one processor via the user interface, the configured at least one indexed field in response to the at least one request.

2. The method of claim 1, wherein the at least one request includes at least one from among a natural language request, a controlled vocabularies request, and a keyword request.

3. The method of claim 1, wherein the search string relates to a transaction search and includes a combination of at least one from among a keyword, a numeric datum, and a search parameter that is entered by a user to find a result, the search parameter including predetermined characters and predetermined commands that are used to narrow focus of a search action.

4. The method of claim 1, wherein the user interface includes at least one from among a graphical user interface and a multimedia user interface, the multimedia user interface including a virtual assistant interface that utilizes artificial intelligence to perform tasks and services for a user based on natural language commands.

5. The method of claim 1, further comprising:
   ingesting, by the at least one processor, raw data from a plurality of sources, the raw data including transaction data for a plurality of users;
   generating, by the at least one processor, structured data in a predetermined file format based on the ingested raw data;
   indexing, by the at least one processor, the structured data; and
   persisting, by the at least one processor in the at least one networked repository, the indexed structured data, the indexed structured data including the at least one indexed field.

6. The method of claim 5, wherein the raw data is ingested in real-time from a plurality of sources based on an occurrence of an event.

7. The method of claim 5, wherein the indexing further comprises:
   receiving, by the at least one processor, the structured data;
   filtering, by the at least one processor, the structured data to remove at least one first character, the at least one first character including a formatting character that relates to formatting instructions;
   tokenizing, by the at least one processor, the filtered structured data to identify at least one textual unit; and
   filtering, by the at least one processor, the at least one textual unit to remove at least one second character, the at least one second character relating to at least one from among a stop word and a letter case.

8. The method of claim 1, further comprising:
   receiving, by the at least one processor via the application programming interface, at least one partial search string from the user interface;
   validating, by the at least one processor, at least one user entitlement that is associated with the at least one partial search string;
   determining, by the at least one processor using a natural language processing technique, at least one predicted user intent; and
   mapping, by the at least one processor, the at least one predicted user intent with corresponding user information according to the validated at least one user entitlement.

9. The method of claim 8, further comprising:
   initiating, by the at least one processor, a call to at least one data service to retrieve the corresponding user information based on the mapping;
   receiving, by the at least one processor, at least one reply in response to the call; and
   presenting, by the at least one processor via the user interface, the at least one reply.

10. The method of claim 9, wherein the call is initiated by using an aggregation service via a content application programming interface that corresponds to each of the at least one data service to enable simultaneous processing of the call by the at least one data service.

11. A computing device configured to implement an execution of a method for providing search capabilities across a plurality of platforms to identify information from a plurality of related accounts, the computing device comprising:
   a processor;
   a memory; and a communication interface coupled to each of the processor and the memory, wherein the processor is configured to:

receive, via an application programming interface, at least one request from a user interface, the at least one request including a search string and a user profile;

identify at least one account identifier based on the user profile;

associate the identified at least one account identifier with the at least one request;

retrieve, from at least one networked repository, at least one indexed field based on the at least one request and the associated at least one account identifier;

configure the retrieved at least one indexed field for presentation via the user interface; and present, via the user interface, the configured at least one indexed field in response to the at least one request.

12. The computing device of claim 11, wherein the at least one request includes at least one from among a natural language request, a controlled vocabularies request, and a keyword request.

13. The computing device of claim 11, wherein the search string relates to a transaction search and includes a combination of at least one from among a keyword, a numeric datum, and a search parameter that is entered by a user to find a result, the search parameter including predetermined characters and predetermined commands that are used to narrow focus of a search action.

14. The computing device of claim 11, wherein the user interface includes at least one from among a graphical user interface and a multimedia user interface, the multimedia user interface including a virtual assistant interface that utilizes artificial intelligence to perform tasks and services for a user based on natural language commands.

15. The computing device of claim 11, wherein the processor is further configured to:

ingest raw data from a plurality of sources, the raw data including transaction data for a plurality of users;

generate structured data in a predetermined file format based on the ingested raw data;

index the structured data; and persist, in the at least one networked repository, the indexed structured data, the indexed structured data including the at least one indexed field.

16. The computing device of claim 15, wherein the processor is further configured to ingest the raw data in real-time from a plurality of sources based on an occurrence of an event.

17. The computing device of claim 15, wherein, for the indexing, the processor is further configured to:

receive the structured data;

filter the structured data to remove at least one first character, the at least one first character including a formatting character that relates to formatting instructions;

tokenize the filtered structured data to identify at least one textual unit; and filter the at least one textual unit to remove at least one second character, the at least one second character relating to at least one from among a stop word and a letter case.

18. The computing device of claim 11, wherein the processor is further configured to:

receive, via the application programming interface, at least one partial search string from the user interface;

validate at least one user entitlement that is associated with the at least one partial search string;

determine, by using a natural language processing technique, at least one predicted user intent; and map the at least one predicted user intent with corresponding user information according to the validated at least one user entitlement.

19. The computing device of claim 18, wherein the processor is further configured to:

initiate a call to at least one data service to retrieve the corresponding user information based on the mapping;

receive at least one reply in response to the call; and present, via the user interface, the at least one reply.

20. The computing device of claim 19, wherein the processor is further configured to initiate the call by using an aggregation service via a content application programming interface that corresponds to each of the at least one data service to enable simultaneous processing of the call by the at least one data service.

* * * * *